Patented Nov. 15, 1949

2,487,849

UNITED STATES PATENT OFFICE 2,487,849

PROCESS FOR PREPARING ENOLIC ESTERS

John R. Caldwell, Kingsport, Tenn., assignor to Eastman Kodak Company, Rochester, N. Y., a corporation of New Jersey No Drawing. Application September 8, 1948, Serial No. 48,317

10 Claims. (Cl. 260—484)

This invention relates to a process for preparing enolic esters.

It is known that ketene ($CH_2=C=O$) and substituted ketenes will react with certain ketones, in the presence of an acid catalyst, to produce unsaturated carboxylic esters. For example, ketene can be reacted with acetone, in the presence of hydrochloric, sulfuric, or phosphoric acids, to produce isopropenyl acetate. See U. S. Patent 2,383,965 issued September 4, 1945, to Gwynn and Degering. Likewise, U. S. Patents 2,407,301 and 2,407,302, granted September 10, 1946, to Spence and Degering, teach that ketene can be condensed with diketones and ketoesters in the presence of an acid catalyst containing the group —$SO_2OH$ (e. g. sulfuric acid, a halogenosulfonic acid such as chlorosulfonic acid, an ankylsulfuric acid such as methylsulfuric acid or a sulfamic acid such as $(CH_3)_2N-SO_2-OH$) to produce enol acetates of these keto compounds. Sulfuric acid is one of the most efficacious catalysts for this process.

I have now found that by employing phosphorus oxychloride ($POCl_3$) as a catalyst in the reactions between ketene or substituted ketenes and monoketones, diketones, or ketoesters that yields of the desired enolic esters are increased as compared with yields obtained from the same process using sulfuric acid as the catalyst, and the formation of side-reaction products is reduced. These results were quite unexpected since phosphoric acid has but very little catalytic effect on the same reactions.

It is, accordingly, an object of my invention to provide an improved process for preparing enolic esters. Other objects will become apparent hereinafter.

In accordance with my invention, the enolic esters are prepared by passing ketene or a substituted ketene into a solution of the phosphorus oxychloride catalyst in an enolizable keto compound. The ketene is ordinarily passed into the solution over a period of from 1 to 6 hours until at least 1 mol of ketene for each mol of keto compound has been absorbed. The reaction mixture is then neutralized by the addition of a neutralizing reagent, such as sodium acetate, sodium bicarbonate, sodium hydroxide, or similar compounds, and decanted from the residue. The enolic ester is recovered from the decanted liquor by distillation. The temperature of the reaction can be varied over a wide range, for example, from 50° C. to 100° C., the preferred range of temperature being from 65° C. to 75° C. The concentration of the catalyst can be varied from 0.1 to 2.0 per cent by weight of the ketone, diketone, or ketoester, the preferred range being from 0.5 to 1.0 per cent.

Ketene or a substituted ketene can be employed in practicing my invention, e. g., simple ketene ($CH_2=C=O$), methylketene, dimethyl ketene, diethyl ketene, diphenylketene, etc. All of these substances are included under the term "a ketene." The simplest ketene ($CH_2=C=O$) is especially efficacious, I have found. It can be prepared by the pyrolysis of acetone, removing the small quantity of residual acetone by passing vapors through a series of cold traps before utilizing the ketene for reaction with the keto compound.

Enolizable keto compounds which can be employed in the process of my invention include monoketones, diketones, and ketoesters. Keto compounds having 3 or more hydrogen atoms on the carbon atoms adjacent to the keto group ordinarily react readily in accordance with my new process.

Specifically, the enolizable keto compounds which can be used in the practice of my invention include mono ketones such as acetone, methyl ethyl ketone, diethyl ketone, methyl isobutyl ketone, methyl n-amyl ketone, methyl n-hexyl ketone, methyl vinyl ketone, methyl isopropenyl ketone, ethyl n-propyl ketone, di-n-propyl ketone, n-propyl vinyl ketone, cyclohexanone, cyclopentanone, acetophenone, mesityl oxide, phenyl n-propyl ketone, phenyl n-butyl ketone, methylbenzyl ketone, methyl furfuryl ketone, difurfuryl ketone, acetophenone, benzylethyl ketone, etc.; diketones, such as biacetyl (2,3-butanedione), acetylpropionyl, acetyl acetone, acetylisobutyryl, mipropionyl, 2,4-hexanedione, 2,4-heptanedione, 5 - methyl - 2,4 - hexanedione, benzoylacetone, benzoylethyl methyl ketone, benzoyl-n-butyl methyl ketone, 1-phenyl-2,4-pentanedione, 2,6-heptanedione, 1,3-cyclohexanedione, 3,6-octanedione, 2,5-hexanedione, 6-methyl-2,5-heptanedione, etc.; and ketoesters such as ethyl pyruvate, methyl pyruvate, ethyl propionylformate, ethyl n-butyrylformate, ethyl isovalerylformate, methyl acetoacetate benzylacetoacetate, ethyl acetoacetate, ethyl propionoacetate, phenyl acetoacetate, ethyl decanoylacetate, methyl levulinate, ethyl levulinate, ethyl α-acetylpropionate, etc.

The following examples will serve to illustrate further the manner of practicing the invention.

*Example 1.—Isopropenyl acetate*

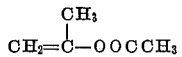

1 gram of phosphorus oxychloride was dissolved in 250 cc. of acetone and the solution brought to a gentle reflux. Ketene was then passed into the solution and, after 1 mol had been absorbed, the mixture was stirred with 5 grams of sodium acetate and then decanted from the solid residue. The decanted liquor was distilled and a 65–70 per cent yield of isopropenyl acetate, boiling at 96° C. at 740 mm. of Hg pressure was obtained.

*Example 2.—α-Acetoxystyrene*

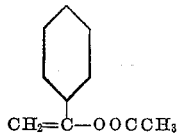

Ketene was passed into a solution of acetophenone and 0.5 per cent by weight of the acetophenone of phosphorus oxychloride, while the temperature was maintained at 65–70° C. The ketene was passed in until one molecular proportion of ketene for each molecular proportion of acetophenone, present, had been absorbed. The mixture was then neutralized with sodium acetate and the supernatent liquid decanted. This decanted liquor was distilled and a 60–65 per cent yield of α-acetoxystyrene, boiling at 85° C. at 2 mm. of Hg pressure and having a refractive index (20/D) of 1.5329 was obtained.

*Example 3*

Ketene was passed into a solution of ethyl acetoacetate containing 0.4 per cent phosphorus oxychloride, the temperature of the solution being maintained at 70–75° C. The ketene was passed in until one molecular proportion of ketene for each molecular proportion of ethyl acetoacetate, present, had been absorbed. The mixture was then neutralized with sodium acetate and the supernatent liquid decanted. The decanted liquor was distilled and a 60–65 per cent yield of enol acetate of acetoacetate, boiling at 89° C. at 10 mm. of Hg pressure was obtained.

*Example 4*

Ketene was passed into a solution of 2-butanone containing 0.5 per cent phosphorus oxychloride while the temperature was maintained at 65° C. The ketene was passed in until one molecular proportion of ketene for each molecular proportion of 2-butanone, present, had been absorbed. The mixture was then neutralized with sodium acetate and the supernatent liquid decanted. The decanted liquor was distilled and a 55–60 per cent yield of enol acetate of 2-butanone boiling at 118–120° C. at 750 mm. of Hg pressure and having a refractive index (20/D) of 1.4111 was obtained.

*Example 5*

Ketene was passed into a solution of mesityl oxide containing 0.5 per cent phosphorus oxychloride, the temperature being maintained at 75° C. The ketene was passed in until one molecular proportion of ketene for each molecular proportion of mesityl oxide, present, had been absorbed. The mixture was then neutralized with sodium acetate and the supernatent liquid decanted. The decanted liquor was distilled and a 55–60 per cent yield of enol acetate of mesityl oxide, boiling at 57–58° C. at 10 mm. of Hg pressure, with a refractive index (20/D) of 1.4611, was obtained.

*Example 6*

Ketene was passed into a solution of acetyl acetone containing 0.5 per cent phosphorus oxychloride, while the temperature was maintained at 75° C. The ketene was passed in until one molecular proportion of ketene for each molecular proportion of acetyl acetone, present, had been absorbed. The mixture was then neutralized with sodium acetate and the supernatent liquid decanted. The decanted liquor was distilled and a 65–70 per cent yield of enol acetate of acetyl acetone, boiling at 79° C. at 11 mm. of Hg pressure, was obtained.

In the manner illustrated above, ketene and methyl n-propyl ketone react to give the enol acetate of methyl n-propyl ketone, ketene and methyl vinyl ketone react to give the enol acetate of methyl vinyl ketone, ketene and cyclopentanone react to give 1-acetoxy-1-cyclopentene, ketene and biacetyl react to give the enol acetate of biacetyl, ketene and ethyl pyruvate react to give the enol acetate of ethyl pyruvate, ketene and ethyl propionylformate react to give the enol ester of ethyl propionylformate, etc.

What I claim as my invention and desire to be secured by Letters Patent of the United States is:

1. A process for preparing enolic esters comprising reacting a ketene with a keto compound having at least 3 hydrogen atoms on the carbon atoms adjacent to the keto group, said keto compound being selected from the group consisting of monoketones, diketones, and ketoesters, in the presence of phosphorus oxychloride as a catalyst.

2. A process for preparing enolic esters comprising reacting a ketene and a monoketone having at least three hydrogen atoms attached to the carbon atoms, adjacent to the keto group, in the presence of phosphorus oxychloride as a catalyst.

3. A process for preparing enolic esters comprising reacting a ketene and a diketone having at least three hydrogen atoms attached to the carbon atoms adjacent to one of the keto groups, in the presence of phosphorus oxychloride as a catalyst.

4. A process for preparing enolic esters comprising reacting a ketene and a ketoester having at least three hydrogen atoms attached to the carbon atoms adjacent to the keto group, in the presence of phosphorus oxychloride as a catalyst.

5. A process for preparing enolic esters comprising reacting a ketene and a monoketone having at least three hydrogen atoms attached to the carbon atoms adjacent to the keto group, in the presence of phosphorus oxychloride as a catalyst, the phosphorus oxychloride being in a concentration of from 0.1 to 2.0 per cent based on the weight of the monoketone.

6. A process for preparing enolic esters comprising reacting a ketene and a diketone having at least three hydrogen atoms attached to the carbon atoms adjacent to one of the keto groups, in the presence of phosphorus oxychloride as a catalyst, the phosphorus oxychloride being in a concentration of from 0.1 to 2.0 per cent based on the weight of the diketone.

7. A process for preparing enolic esters comprising reacting a ketene and a ketoester having at least three hydrogen atoms attached to the carbon atoms adjacent to the keto group, in the presence of phosphorus oxychloride as a catalyst, the phosphorus oxychloride being in a concentration of from 0.1 to 2.0 per cent based on the weight of the ketoester.

8. A process for preparing isopropenyl acetate comprising reacting ketene ($CH_2=C=O$) and acetone, in the presence of phosphorus oxychloride as a catalyst, the phosphorus oxychloride being in a concentration of from 0.1 to 2.0 per cent based on the weight of the acetone.

9. A process for preparing the enol acetate of acetyl acetone comprising reacting ketene ($CH_2=C=O$) and acetyl acetone, in the presence of phosphorus oxychloride as a catalyst, the phosphorus oxychloride being in a concentration of from 0.1 to 2.0 per cent based on the weight of the acetyl acetone.

10. A process for preparing the enol acetate of ethyl acetoacetate comprising reacting ketene ($CH_2=C=O$) and ethyl acetoacetate, in the presence of phosphorus oxychloride as a catalyst, the phosphorus oxychloride being in a concentration of from 0.1 to 2.0 per cent based on the weight of the ethyl acetoacetate.

JOHN R. CALDWELL.

No references cited.